May 29, 1962   W. HUGHES   3,036,926
PROCESS FOR IMPROVING TITANIUM DIOXIDE PIGMENTS
Filed March 24, 1959
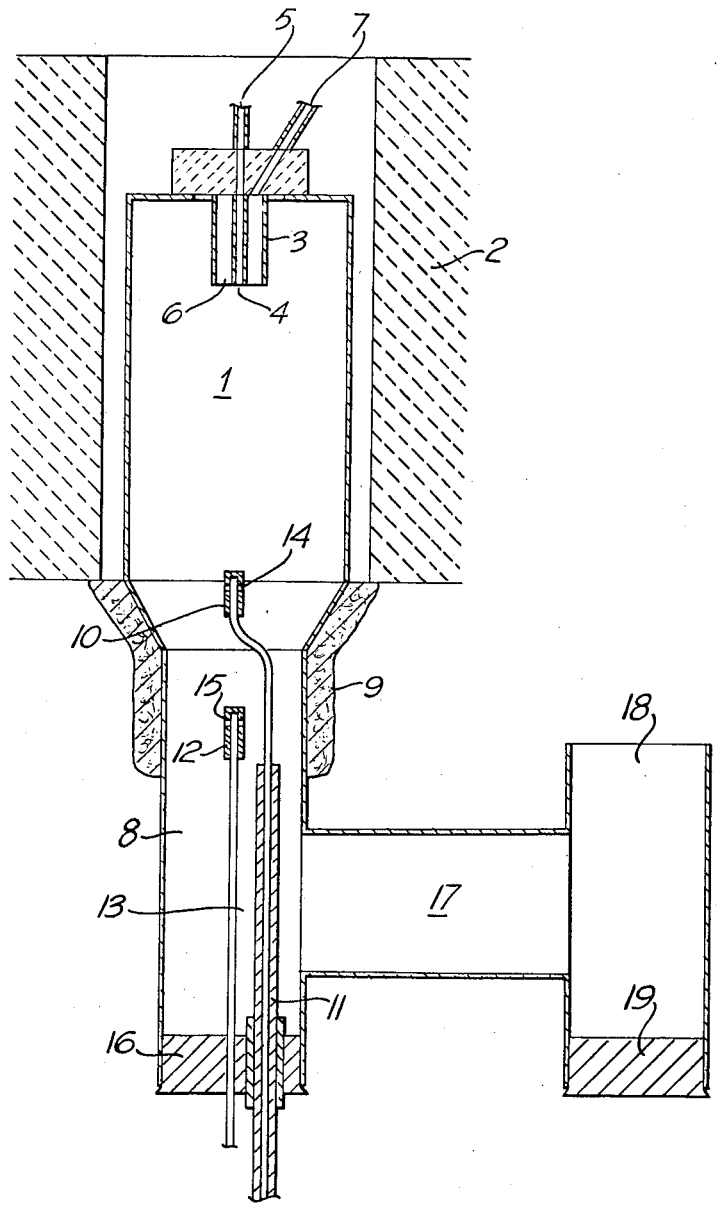
INVENTOR
WILLIAM HUGHES
ATTORNEY United States Patent Office 3,036,926
Patented May 29, 1962

3,036,926
PROCESS FOR IMPROVING TITANIUM
DIOXIDE PIGMENTS
William Hughes, Fairfield, Stockton-on-Tees, England, assignor to British Titan Products Company Limited, Durham, England, a company of Great Britain
Filed Mar. 24, 1959, Ser. No. 801,473
Claims priority, application Great Britain Mar. 24, 1958
15 Claims. (Cl. 106—300)

The process of this invention for improving titanium dioxide pigments may be applied to titanium oxide pigments prepared by the calcination and milling of the hydrated oxide precipitated from acid solutions of titanium but is particularly adapted for use in the treatment of pigments prepared by the vapour phase reaction between titanium tetrachloride and oxygen.

Various methods have been described for the production of titanium oxide in anatase or rutile form, or in mixtures of these forms, by said vapour phase reaction. These may involve direct reaction between the titanium tetrachloride vapour and the oxygen or oxygen-containing gas separately admitted into a space with no other accompaniment, the reactants usually having been preheated before contact. Alternatively the reaction is effected in a space in which heat has been generated by an auxiliary exothermic reaction such as the burning of a combustible gas in situ. A further method involves reaction between the titanium tetrachloride vapour and oxygen-containing gas in a fluidised bed of inert solid material.

The reaction between titanium tetrachloride and oxygen is exothermic and the necessity or otherwise for supplying auxiliary heat will depend on particulars of the method of production employed. Gases inert under the conditions of operation such as, for instance, nitrogen or chlorine may optionally be present.

The products of reaction usually emerge from the reaction chamber at temperatures between 700–1200° C. and it is desirable to cool them prior to any subsequent separation treatment of the pigment.

Various methods of cooling may be adopted, indirect or direct, but due to the corrosive tendency of the gases the latter method is preferred.

Direct cooling may be conducted by recycling the tail gases which may comprise chlorine, hydrogen chloride, unreacted components and inert gases, originally emanating from the reactor, or by the injection of liquid chlorine or atomised liquid titanium tetrachloride.

Indirect cooling may be conducted in a variety of ways, e.g. by passing the hot pigment-laden gases upwards through a bed of inert material which is fluidised thereby, thus transferring the excess heat to the cooled walls about the bed or cooling tubes located within the bed.

In any case the cooling may bring the temperature down to within the range 250–750° C. Further cooling can be effected through metal ducting or alternatively the titanium oxide may be removed at these temperatures from the gas by filtration through various media, e.g. ceramic filter candles, or by means of a cyclone.

In the conduct of the vapour phase reaction between titanium tetrachloride and an oxygen-containing gas, in consequence partly of the inadvertent introduction of hydrogenous substances into the reaction chamber during reaction or at a later stage of the process or on exposure to the atmosphere, certain proportions of acid are produced which latter may be associated with the fine pigment. Even when no hydrogenous material is present pigments having an acid reaction are generally obtained due to the formation of traces of oxychlorides and adsorption of chloride and chlorine at the pigment surface, and possibly for other reasons. Further, pigments as generally prepared by this reaction are not always stable to the action of light when exposed in various organic media such as are present, for example, in paints. It is, therefore, desirable to coat these pigments with certain oxides or hydroxides of selected elements to improve the stability of the pigment to the action of light.

By the process of this invention not only is the durability of the pigment improved but there is also an improvement by way of a removal or reduction of adsorbed acid contaminant or in a reduction of acidity in the pigment.

The process according to the invention for improving titanium dioxide pigment is by reacting it partially with an aluminum halide to produce alumina in intimate association therewith and to produce also titanium tetrahalide vapour, and then reacting the latter with water vapour in the presence of the partially reacted pigment to recover titanium dioxide in intimate association therewith.

The reaction with the aluminium halide is performed preferably at a temperature within the range of 250 to 750° C., and the reaction with the water vapour is preferably performed at a temperature within the range of 180 to 600° C. Generally the latter reaction will be performed at a temperature lower than that of the former reaction.

It is preferred to carry out the process on titanium dioxide pigment as it comes, entrained in gases, freshly produced by vapour phase oxidation of titanium tetrachloride.

If the process of the invention is not applied during the process of manufacturing titanium oxide pigment by the vapour phase reaction between titanium tetrachloride and oxygen, then the pigment to be treated must be dispersed in the hot state, e.g. in a stream of hot air or other gas at the appropriate temperature.

A preferred embodiment of the invention will now be described:

The titanium oxide particles resulting from the vapour phase oxidation of titanium tetrachloride with oxygen or oxygen-containing gas and emerging from the reaction chamber entrained in the effluent gases at a temperature of the order of 1000° C. are cooled, preferably directly, to a temperature in the range of 250–750° C. Aluminum chloride vapour is admitted to the titanium oxide-containing gas stream in a proportion of from 0.1 to 10% by weight, calculated as $Al_2O_3$ on $TiO_2$. Under these conditions, reaction takes place so as to produce alumina as solid and titanium tetrachloride as vapour. The alumina thus produced is associated with and substantially collected on the particles of titanium dioxide pigment obtained in the initial reaction. The titanium tetrachloride which is produced by the reaction may in part be adsorbed by the titanium oxide particles undergoing reaction with aluminium chloride.

The gases entraining the titanium oxide particles on to which the alumina has been precipitated are then further treated at a temperature between 180° and 600° C., preferably between 200° and 500° C., with steam or water vapour in quantity sufficient to react with titanium tetrachloride present in the gas stream and particularly the amount thereof that constitutes a by-product in the reaction between titanium oxide and aluminium chloride. The reaction which takes place at this stage may be indicated by the following equation:

$$TiCl_4 + 2H_2O = TiO_2 + 4HCl$$

Conversion by this means to titanium oxide of the resultant titanium tetrachloride present in association with the treated pigment is substantially complete and the $TiO_2$ so formed is at least in part associated with the other solids in the gas stream. In the event that it should be found desirable to precipitate a larger proportion of $TiO_2$ by reaction with steam according to the invention, there may be admitted additional quantities of titanium tetrachloride to the titanium pigment suspension at any stage prior to the introduction of the steam.

After the treatment with steam or water vapour the gases may, if necessary, be further cooled and the solids when removed therefrom by means of cyclones or filters, optionally aided by electrostatic precipitation, or by a quenching operation in which liquids, as for example, water, are used. In the latter case a wet filtration operation may ensue, the separated solids then being dried.

The processed pigment which has been separated by any of the above means from the gases entraining it may undergo further treatment, e.g. dry grinding or wet grinding (including hydroseparation). Further neutralisation of the treated pigment may be accomplished by conventional means in the latter operation.

The primary treatment of the newly-synthesised titanium oxide pigment with an aluminium halide to produce alumina and a subsequent secondary conversion to titanium oxide of the residual titanium tetrachloride associated therewith may be conducted in various ways within the scope of this invention. Thus, additions of the aluminium halide and steam or water vapour may be made consecutively in a conduit, leading from the reaction chamber wherein the initial titanium oxide is produced, wherein the emergent gases are partially cooled. Alternatively, such additions may be effected in separate but contiguous vessels. Said additions may also be carried out within a chamber containing a bed of inert solids as, for example, zircon, rutile, silica, alumina or the like maintained in a fluidized condition by inert gases, preferably tail gases recycled from the chamber wherein the titanium oxide is produced by reacting titanium tetrachloride in vapour phase with an oxygen-containing gas.

While the alumina formed during the course of the process of the invention is preferably derived from aluminium chloride, it will be appreciated that other aluminium halides, especially aluminium bromide, can be employed.

The aluminium chloride used in the primary treatment of the precipitated titanium oxide is anhydrous. It may be introduced into the reaction zone by diverse means either directly as a solid or as a solution in a solvent such as titanium tetrachloride or carbon tetrachloride or, preferably, acetyl chloride: it may also be added in vaporous form, being thus generated either from an aluminium chloride/alkali metal chloride melt or by passing chlorine over heated aluminium metal or a mixture of alumina and carbon. The aluminium may be introduced directly into the reaction gas mixture in the form of aluminium powder which is so fine that it will react immediately with the chlorine gases contained in the mixture. While the foregoing instances represent certain modes in which the aluminium chloride may be formed, they are not intended to be regarded as limitations in this respect.

The water used in the subsequent treatment may be introduced as liquid or as vapour, and it may be admixed with air or with an inert gas. Steam can be directly utilised or it may be produced in situ by combustion of a fuel gas-oxygen gas mixture.

The time of contact with respect to the treatments with aluminium halide and with water vapour may be quite brief. It should last not less than .001 second and preferably not less than .1 second.

A reactor suitable for carrying out a process according to the invention is shown in the accompanying diagrammatic drawing which is in sectional elevation. It comprises a cylindrical upper part 1 heated by an electric furnace 2. This upper part is an oxidation chamber wherein titanium tetrachloride vapour is reacted with oxygen.

A nozzle 3 has a central passage 4 for the introduction of the titanium tetrachloride supplied at an inlet 5, and a surrounding passage 6 for the introduction of oxygen supplied at an inlet 7.

The bottom of the upper part 1 tapers into a cylindrical lower part 8 of reduced diameter, provided with heat insulation as indicated at 9. This is where the titanium dioxide is treated according to the invention. There is therefore provided an injector 10 for aluminium chloride vapour supplied through a duct 11, and an injector 12, lower down, for water vapour supplied through a duct 13. Injector 10 has radial delivery ports 14, and injector 12 has similar radial delivery ports 15. The supply ducts 11 and 13 enter the reactor through a removable bottom seal or bung 16.

Products of reaction pass out through a duct 17 to an outlet passage 18 leading to a collecting system (not shown). The bottom of the passage 18 is closed by a removable bung 9.

The following are examples of the process carried out in a reactor such as is illustrated in the drawing.

*Example 1*

The nozzle 3 at the top of the reaction chamber, 6" in diameter, is a steatite burner having a central 6 mm. jet surrounded by an annular concentric ducting of internal diameter 15 mms. and outside diameter 26 mms. The injector 10, made of steatite, has three delivery ports 14 each 1 mm. in diameter for the admission of aluminium chloride vapour. About 9" below the injector 10 is a like injector 12 for the admission of water vapour.

Liquid titanium tetrahalide is fed uniformly at the rate of 5 ccs. per minute into a preheater (not shown), where it is evaporated and raised to a temperature of 900° C., and thence supplied to the central jet of the nozzle 3. At the same time oxygen is also fed uniformly at the rate of 5.1 liters per minute measured at low temperature into a preheater (not shown) where it is raised to a temperature of 900° C., and thence supplied to the annular ducting of the nozzle 3. Reaction takes place at a temperature of 1060° C. as measured by a thermocouple placed within the reaction chamber. The product leaving the oxidation zone is substantially a suspension of titanium oxide pigment in chlorine and any excess oxygen. This, on passing out of the oxidation zone, is cooled by heat exchange with the walls of the ducting down to a temperature of 530° C. at the place where it meets aluminium chloride vapour admitted through the injector 10. The aluminium chloride vapour is obtained by having a molten mass consisting of 60% (molar) of aluminium chloride, the remainder being sodium chloride, and bubbling therethrough 8 litres per minute of carbon dioxide, the molten mass being maintained throughout at a temperature of 185° C. By this procedure the amount of aluminium chloride vapourised and then fed through the injector 10 corresponds to 1% of $Al_2O_3$ on the $TiO_2$ pigment. The time of contact of titanium dioxide particles with aluminium chloride vapour was 2 seconds.

As the product stream proceeds down the lower part of the reactor, it is further cooled by heat exchange with the wall to a temperature of 460° C. at the place where it meets water vapour introduced through injector 12. The water vapour is produced by the passage of 6.3 litres per minute of nitrogen through water maintained at a temperature of 28° C. The time of contact of the particles with the water vapour was 9 seconds.

The product stream is then further cooled by heat exchange with the wall of the reactor and is passed into a collecting system.

The process as described is conducted for a period of 30 minutes and the product collected will be found to have an excellent tone and colour and a pH of 4.7. The latter value is obtained by mixing 2 grams of the pigment with 20 ccs. of water and estimating the pH value of the slurry so obtained.

The product, when tested in a baking finish, will be found to have a good resistance to yellowing and a good chalking resistance.

*Example 2*

In this case the reactor is 8" in diameter and the nozzle 3 for the admission of titanium tetrachloride vapour with oxygen is drilled with eight holes 1.3 mms. in diameter surrounded by an annular passage of internal diameter 15 mms. and outside diameter 25 mms. Titanium tetrachloride fed at the rate of 7.5 ccs. liquid per minute into a preheater, where it is evaporated and raised to a temperature of 930° C., is fed through said holes, and oxygen supplied at the rate of 7.65 litres per minute is preheated to a temperature of 860° C. and then fed through the annular passage. The temperature of the reaction, as measured by a thermocouple inside the chamber 1, is maintained at 950° C.

The aluminium chloride vapour is produced by passing chlorine gas at the rate of 38 ccs. per minute into a silica tube containing pieces of aluminium metal maintained at a temperature of 550° C. The chlorine gas is quantitatively converted to aluminium trichloride and the vapour, together with 6 litres per minute of nitrogen, is injected into the reactor through the steatite injector 10. The admission of the water vapour through the steatite injector 12 is as described in Example 1. The temperature in the vicinity of the point of admission of aluminium chloride vapour as measured by thermocouple is 550° C. and in the vicinity of the point of admission of the water vapour is 425° C.

The time of contact with respect to the aluminium chloride treatment was 3.5 seconds, and with respect to the water vapour was 10 seconds.

The process is continued for 30 minutes and the product, after being treated as described in Example 1, will be found to be of good colour and tone and of soft texture. Its rutile content is 96.6% and tinting strength, as measured by the Reynolds method, is 1600. It contains 1.12% $Al_2O_3$ and 0.38% "active" $TiO_2$. The actual physical and chemical nature of the active $TiO_2$ is not precisely known but can be defined as that percentage of the total $TiO_2$ which is soluble in concentrated hydrochloric acid at 100° C.

We claim:

1. A method of treating finely divided titanium dioxide which comprises reacting said titanium dioxide suspended in gases with aluminum chloride vapor at a temperature high enough to cause the titanium dioxide to react with aluminum chloride vapor, said gases being inert to said reaction and thereafter immediately contacting the resulting mixture with water vapor.

2. A method of treating finely divided titanium dioxide which comprises contacting said titanium dioxide with aluminium chloride vapor at a temperature of 250 to 750° C. and thereafter contacting the resulting mixture with water vapor at a temperature of 180 to 600° C.

3. A method of treating finely divided titanium dioxide which comprises contacting said titanium dioxide with aluminium chloride vapor at a temperature of not less than 250° C. and thereafter contacting the resulting mixture with water vapor at a temperature not less than 180° C.

4. In the method of preparing titanium dioxide by reaction of titanium tetrachloride with oxygen thereby forming a hot gaseous suspension of titanium dioxide, the improvement which comprises introducing aluminium chloride vapor into said hot gaseous suspension at a temperature high enough to cause the titanium dioxide to react with aluminum chloride vapor and thereafter introducing water vapor into the resulting mixture.

5. In the method of preparing titanium dioxide by reaction of titanium tetrachloride with oxygen thereby forming a gaseous suspension of titanium dioxide, the improvement which comprises introducing aluminium chloride vapor into said gaseous suspension while the suspension is at a temperature not less than 250° C. and thereafter introducing water vapor into the resulting mixture.

6. In the method of preparing titanium dioxide by reaction of titanium tetrachloride with oxygen thereby forming a gaseous suspension of titanium dioxide, the improvement which comprises introducing aluminium chloride vapor into said gaseous suspension while the suspension is at a temperature not less than 250° C. and thereafter introducing water vapor into the resulting mixture while the temperature of the mixture is above 180° C.

7. The process of claim 6 wherein the temperature of the gas suspension is 250 to 750° C. and the temperature of the mixture is 200 to 500° C.

8. The process of claim 7 wherein the amount of aluminium chloride is 0.1 to 10% by weight calculated as $Al_2O_3$ and based upon $TiO_2$ in the suspension and the amount of water introduced is sufficient to react with all titanium tetrachloride in the mixture.

9. The process of claim 5 wherein water vapor and titanium tetrachloride vapor are introduced into the mixture.

10. A method of treating finely divided titanium dioxide which comprises establishing a suspension of titanium dioxide in a gaseous medium at a temperature high enough to cause aluminum chloride vapor to react with titanium dioxide, contacting the titanium dioxide with aluminum chloride vapor, and thereafter contacting the resulting mixture with water vapor at a temperature not less than about 180° C.

11. The method of claim 10 wherein the water vapor comprises water vapor and titanium tetrachloride vapor.

12. A method of treating finely-divided titanium dioxide which comprises contacting said titanium dioxide with aluminum halide vapor at a temperature of 250° to 750° C., the amount of aluminum halide contacted with the titanium dioxide being sufficient to form a titanium dioxide product containing 0.1 to 10 percent by weight of the $TiO_2$ of $Al_2O_3$, and thereafter contacting the resulting product in admixture with titanium tetrahalide with water vapor at a temperature of 180° to 600° C. in an amount sufficient to react with any titanium tetrachloride present in the mixture.

13. A composition of pigmentary titanium dioxide particles which have associated therewith titanium dioxide which is soluble in concentrated hydrochloric acid and alumina, said composition having as its primary particulate titanium dioxide component finely-divided titanium dioxide pigment produced by vapor phase oxidation of titanium tetrachloride, said composition containing 0.1 to 10 percent alumina by weight of said pigment and, in addition to said titanium dioxide pigment, a minor amount of said titanium dioxide soluble in concentrated hydrochloric acid which is not in excess of an amount thereof stoichiometrically equivalent to 10 percent alumina by weight of said pigment.

14. As a new composition of matter, finely divided titanium dioxide pigment produced by vapor phase oxidation of titanium tetrachloride which pigment has deposited thereon 0.1 to 10 percent alumina by weight of said pigment and a minor amount of $TiO_2$ soluble in concentrated hydrochloric acid which is not in excess of an amount thereof stoichiometrically equivalent to 10 percent alumina by weight of said pigment.

15. As a new composition of matter, finely divided titanium dioxide pigment produced by vapor phase oxidation of titanium tetrachloride which pigment has deposited thereon while in gaseous suspension 0.1 to 10 percent alumina by weight of said pigment and a minor amount of $TiO_2$ soluble in concentrated hydrochloric acid which is not in excess of an amount thereof stoichiometrically equivalent to 10 percent alumina by weight of said pigment.

References Cited in the file of this patent

UNITED STATES PATENTS

| | | |
|---|---|---|
| 1,842,620 | McInerney et al. | Jan. 26, 1932 |
| 1,967,235 | Ferkel | July 24, 1934 |
| 2,441,225 | Pechukas | May 11, 1948 |
| 2,559,638 | Krchma et al. | July 10, 1951 |